US008457572B2

(12) United States Patent
Keukens

(10) Patent No.: US 8,457,572 B2
(45) Date of Patent: Jun. 4, 2013

(54) AUDIO COMPARISON METHOD AND APPARATUS

(75) Inventor: Erik Keukens, Eindhoven (NL)

(73) Assignee: NXP B.V., Eindhoven (NL)

( * ) Notice: Subject to any disclaimer, the term of this patent is extended or adjusted under 35 U.S.C. 154(b) by 215 days.

(21) Appl. No.: 12/980,397

(22) Filed: Dec. 29, 2010

(65) Prior Publication Data

US 2011/0189968 A1      Aug. 4, 2011

(30) Foreign Application Priority Data

Dec. 30, 2009   (EP) ..................................... 09181003

(51) Int. Cl.
*H04B 7/08*   (2006.01)
(52) U.S. Cl.
USPC .............................. 455/132; 455/45; 455/312
(58) Field of Classification Search
USPC ......................................................... 455/132
See application file for complete search history.

(56) References Cited

U.S. PATENT DOCUMENTS

| 4,868,881 | A | * | 9/1989 | Zwicker et al. | ............... | 381/107 |
| 6,141,536 | A | * | 10/2000 | Cvetkovic et al. | ............... | 455/45 |
| 7,221,925 | B2 | * | 5/2007 | Wildhagen | ................... | 455/312 |
| 2002/0115418 | A1 | * | 8/2002 | Wildhagen | ................... | 455/133 |
| 2004/0254660 | A1 | * | 12/2004 | Seefeldt | ......................... | 700/94 |
| 2005/0113953 | A1 | | 5/2005 | Smaragdis | | |
| 2008/0281590 | A1 | * | 11/2008 | Breebaart et al. | ............. | 704/231 |
| 2009/0141838 | A1 | * | 6/2009 | Han et al. | ...................... | 375/344 |
| 2009/0282452 | A1 | * | 11/2009 | Wei | ................ | 725/118 |
| 2011/0019805 | A1 | * | 1/2011 | Zoehner | .................... | 379/90.01 |
| 2012/0096482 | A1 | * | 4/2012 | Lee | ................................ | 725/14 |

FOREIGN PATENT DOCUMENTS

JP      2005-340935 A     12/2005

OTHER PUBLICATIONS

Extended European Search Report for European Patent Appln. No. 09181003.6 (Jun. 2, 2010).

* cited by examiner

*Primary Examiner* — Ajibola Akinyemi

(57) ABSTRACT

An audio comparison method and apparatus compares audio streams by measuring the times of volume peaks in the audio streams and identifying correlations between the peaks in the audio streams, subject to possible delay between the streams. The audio comparison allows the identification of audio streams including the same audio content even in the presence of delay and distortion and using low processing power. The audio comparison has particular application in car radios to allow automatic retuning.

16 Claims, 3 Drawing Sheets

AUDIO COMPARISON METHOD AND APPARATUS

This application claims the priority under 35 U.S.C. §119 of European patent application no. 09181003.6, filed on Dec. 30, 2009, the contents of which are incorporated by reference herein.

FIELD OF THE INVENTION

The invention relates to an audio comparison method, particularly but not exclusively for car radio use, together with corresponding apparatus.

BACKGROUND OF THE INVENTION

Car radio receivers need to cope with changing strengths of received radio signals from different radio channels on different receivers as cars drive around. The car can reach areas where the signal received fades. In these cases, it is useful for the radio to find other transmitters transmitting the same channel and to automatically retune.

One way of doing this is known as the Radio Data System (RDS). Radios equipped with RDS receive data together with the audio signal, the data being transmitted at 57 kHz. The data includes information allowing retuning.

It would be desirable to be able to carry out the same retuning without requiring RDS. In order to carry out the retuning, it is necessary to identify other channels being received carrying the same signal as the channel presently being listened to, in other words comparing audio streams.

Systems for comparing audio streams are known. A particular example is the automatic identification of tracks of recorded music stored on a player. Algorithms exist for identifying the tracks of recorded music by comparing features of the tracks with a large database.

However, such systems are not suitable for use with car radios since the car radio environment has a number of difficult features. Firstly, there can be relatively significant time shifts between different transmitters, certainly as much as 100 ms. Secondly, the audio transmitted by radios can be very heavily compressed. Thirdly, there can be considerable signal distortion.

A further problem is that the systems must work in real time in car radios. Even digital car radios have limited computer processing power. Moreover, there is no large pre-prepared database with which to compare the audio channels.

A particular problem with identification of new channels in a retuning application is that the method must work at the time the existing signal is starting to fade. In this case, there can be significant distortion and also some fading of the audio signal. An audio correlation system for use in this environment must therefore be robust.

SUMMARY OF THE INVENTION

According to the invention, there is provided an audio comparison method according to claim 1, and a radio module according to claim 7.

By measuring the peaks in volume and comparing the times of those peaks, a robust measure of the correlation may be obtained.

BRIEF DESCRIPTION OF THE DRAWINGS

Embodiments of the invention will now be described, purely by way of example, with reference to the accompanying drawings, in which.

The drawings are schematic and not to scale.

DETAILED DESCRIPTION OF EMBODIMENTS

Figure 1:
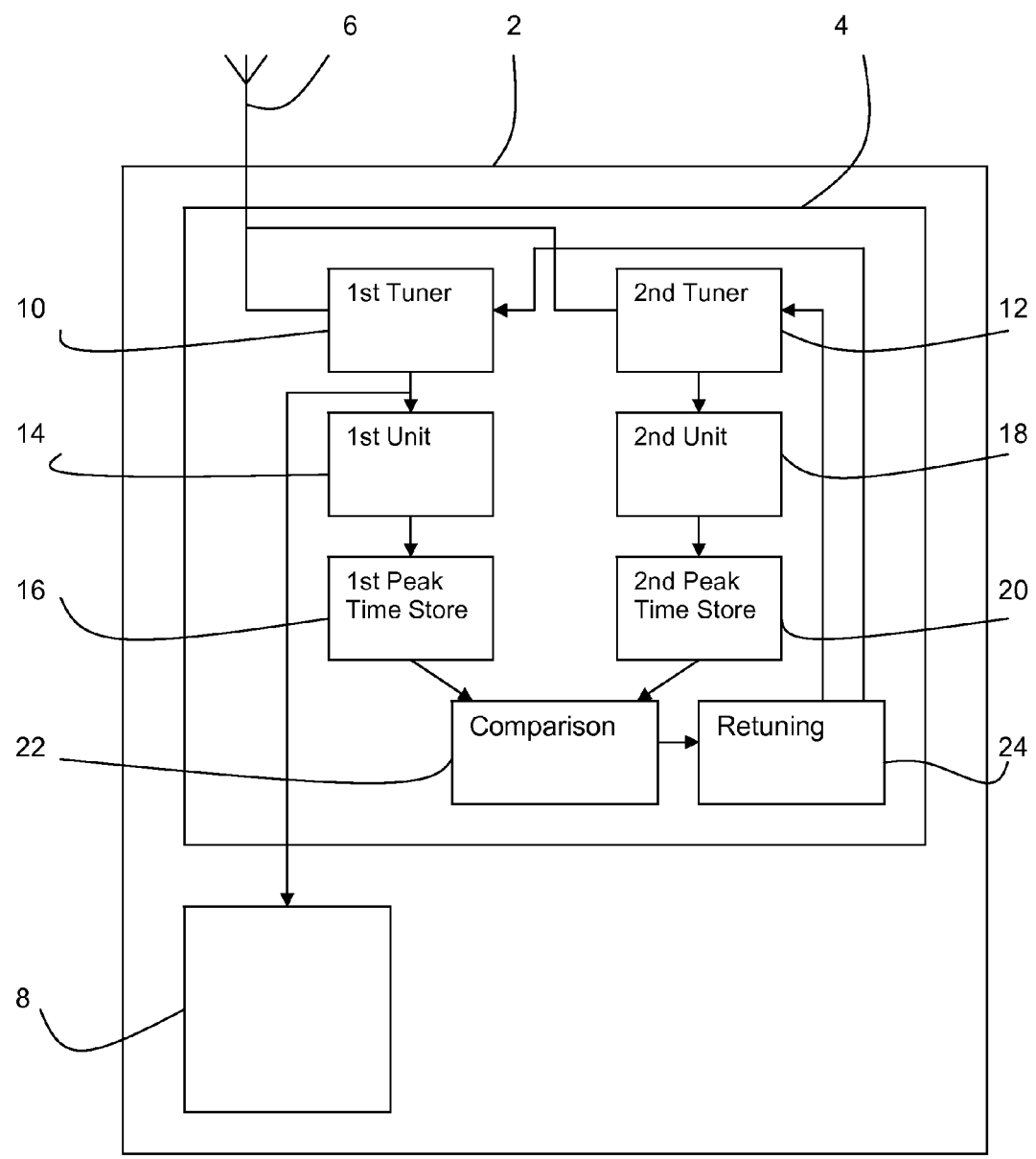
FIG. 1 is a block diagram of a first embodiment of the invention.
Figure 2:
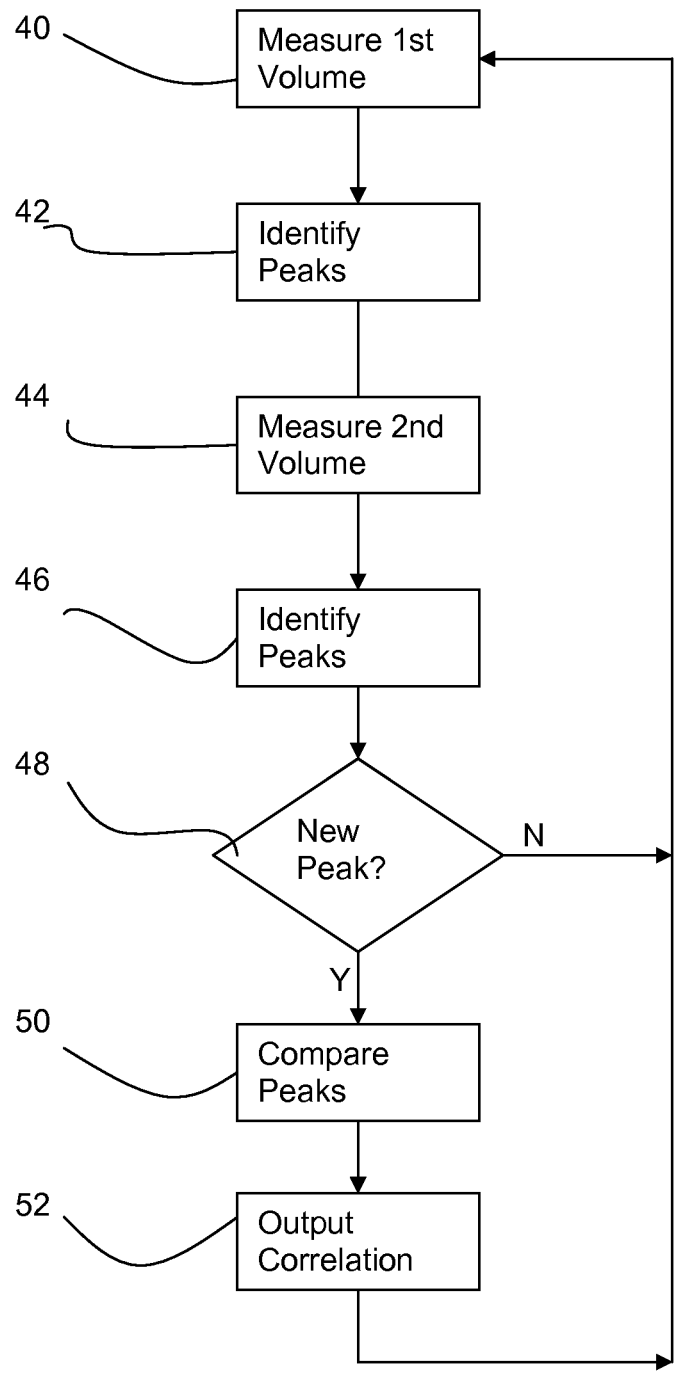
FIGS. 2 and 3 are flow diagrams of a method of the invention.
Figure 3:
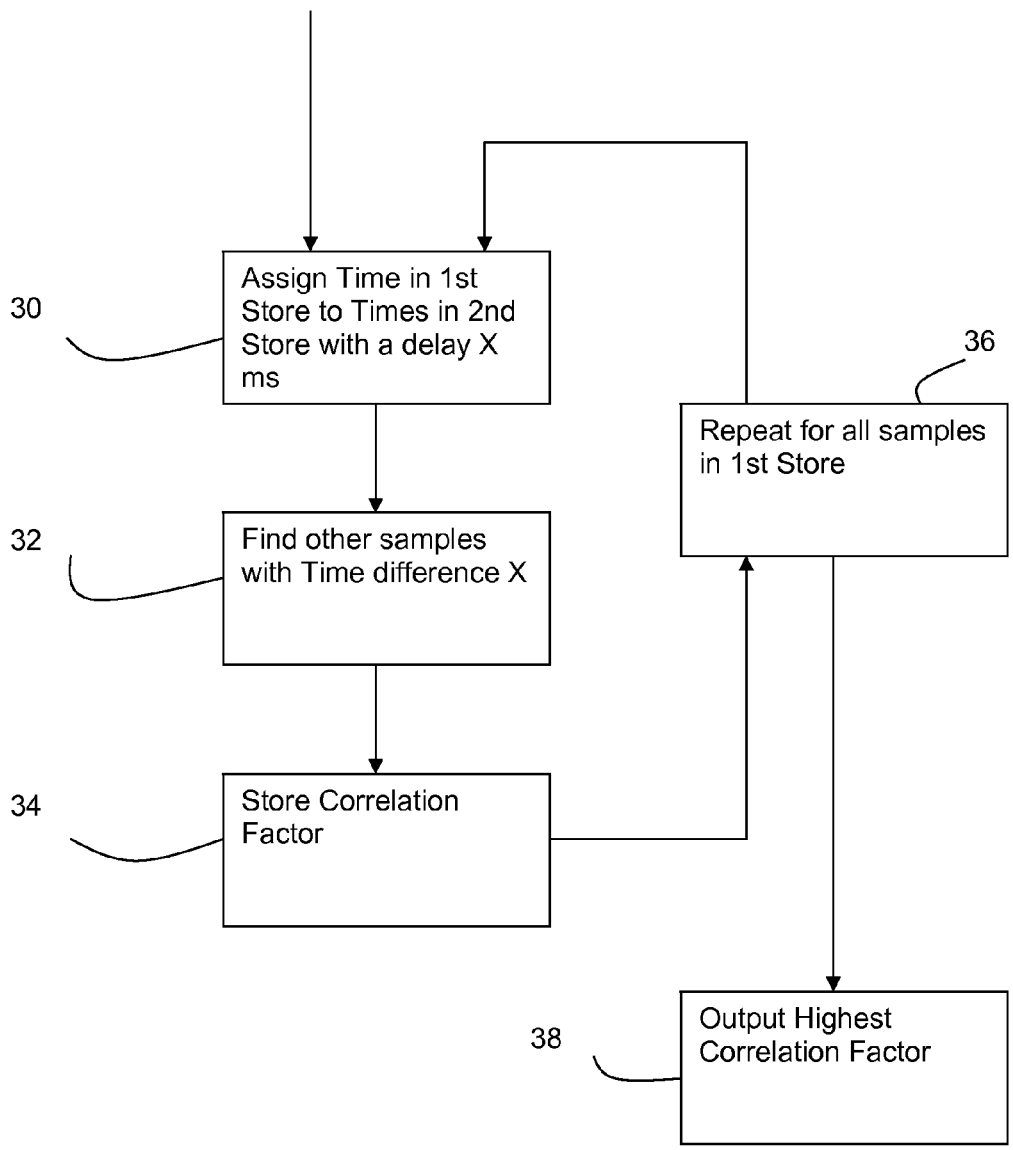

Referring to FIGS. 1 to 3, a car radio 2 is implemented with a radio module 4. The radio module is connected to an antenna 6 and an audio output stage 8 which may be connected to various loudspeakers (not shown) in the car.

The radio module 4 has a first tuner 10 and a second tuner 12. The tuners are independently tunable to different channels and output an audio stream, the audio content of the channel the respective tuners are tuned to. The output of the first tuner 10 will be referred to as a first audio stream and the output of the second tuner will be referred to as a second audio stream The first audio stream is fed to the audio output stage 8 for reproduction on the loudspeakers.

The first audio stream from the first tuner 10 is fed to a first measurement unit 14 which continuously measures (Step 40, FIG. 2) the volume of the first audio stream and identifies (Step 42) peaks in volume of that stream. Only peaks longer than a predetermined minimum peak length are stored, to avoid "spikes" being recorded. The predetermined minimum peak length may be 2 ms to 5 ms.

Further, indistinct peaks are also avoided. This is achieved by ensuring sufficient volume difference between the peak volume and the volume Y ms before and/or after—Y may typically be in the range 2 ms to 5 ms.

The measured times of the peaks are stored in a first stream peak time store 16, which stores a number N of peaks. N is an integer, typically at least 5. Experiments carried out by the inventors on real received radio signals with N=8 showed that typical audio streams had approximately 4 volume peaks a second so that a peak time store with N=8 stored peaks over approximately a 2 s interval.

After the first stream peak time store 16 is full, the first measurement unit continues to measure the volume and determine new peaks. When a new peak is measured, its time replaces the earliest peak time in the first stream peak time store which accordingly is continuously updated.

A second measurement unit 18 and second stream peak time store 20 are connected to the second tuner 12 to carry out the same measurements on the volume of the second audio stream from the second tuner 12 so that the second stream peak time store is filled with second stream peak times. Thus, the volume of the second audio stream is measured (step 44) and the peaks identified (step 46).

A comparison module 22 carries out a comparison on the first stream and second stream peak times as illustrated in the flow chart of FIG. 3 and outputs a correlation value which is a measure of the similarity in the first and second stream peak times. For greatest accuracy, the comparison module 22 operates after the first and second peak time stores 16, 20 are both filled.

The comparison module 22 aims to correlate the peak heights of the two streams. For example, consider a first audio stream with peaks at 1 ms, 210 ms, 560 ms, 1280 ms and 1600 ms. The chances that a second audio stream transmitted at the same time has the same peak heights is very low.

However, the algorithm needs to take into account the differences in transmission times from different transmitters, caused by different signal processing in different transmitters and other factors that introduce a delay. Experiments suggest that this delay can be 60 ms, so the algorithm matches sets of correlation peaks with delays up to a maximum delay X of 60 ms. Of course, the maximum delay may be varied to take account of different transmission arrangements which may exist in different territories—in some territories the delay may be up to 100 ms, or even up to 200 ms, for example.

Thus, in step 30, the comparison module assigns the first sample in the first stream peak time store 16 with each of the samples in the second stream peak time store 20 and calculates a delay X ms. Note that X may be positive or negative.

In step 32, other sample pairs in the two stores 16, 20 with the same delay X are located.

A correlation factor is then calculated based on the match between the sample pairs. For example, the correlation factor may be 1 if all peaks in the first peak time store match with peaks in the second team peak time store, and 0 if no other matches exist. This correlation factor is stored (step 34). The matching of peaks is done at relatively low resolution, for example in the range 1 ms to 10 ms, preferably 1 to 2 ms. This allows the method to work even when there is considerable distortion in the audio signals.

Steps 30, 32 and 34 are then repeated (step 36) for all assignments of samples between the first and second peak time stores 16, 20. Then (step 38) the maximum correlation factor is identified and output (step 40). Thus, the comparison module outputs the best correlation factor between the first and second audio streams.

In an example, the set of peaks in the first peak time store may be at 1000, 1400, 1750, 2100, 2300, 2450 2550 and 2700 ms. The set of peaks in the second peak time store may be 900, 1060, 1809, 2161, 2310, 2390, 2510 and 2760. The best match is then for a delay X of 60 ms, with the second times 60 ms later than the first times. Matches can be identified between the first peak at 1000 and the second peak at 1060, the first peak at 1750 and the second at 1809, the first peak at 2100 and the second at 2161, the first peak at 2450 and the second at 2510, and the first peak at 2700 and the second at 2760. In this case, the resolution is 1 ms—a match is determined if the delay is 60 ms plus or minus 1 ms.

In this case there is a good match. A simple correlation measure may be used—for example the measure may simply be the number of matching peaks, here 5. Since the maximum number of peaks is 8, the correlation may be expressed in the range 0 to 1 by dividing the number of matching peaks by the number of peaks to give the result $5/8=0.625$.

Returning to FIG. 2, when a new peak is added to the first and/or second peak time store 16,20 this is tested for (step 48) and if a new peak is added the comparison module carries out the algorithm illustrated in more detail in FIG. 3 to compare the peaks (step 50) and then outputs (step 52) an updated correlation factor. In this way, the correlation factor is regularly updated and provides a regularly updated measure of the correlation between the audio streams.

A retuning module 24 uses the output of the correlation factor.

The retuning module 24 monitors the quality of the first audio stream. Whilst the radio outputs the first audio stream, the retuning module attempts to identify other radio channels with the same audio signal. This is done by tuning the second tuner 12 to other stations in turn, and taking the output of the comparison module 22 as a measure of the correlation of the streams. In most cases, the correlation will be very low, and those radio channels are rejected. However, where the correlation equals or exceeds a predetermined value, the radio channel is identified as having the same audio content.

In the example above, with five out of eight peaks matching, the predetermined value may be four (with the correlation expressed between zero and eight depending on the number of peaks matching). Accordingly, the retuning module identifies the first and second signals as being the same, since the number of matches (five) is greater than or equal to four.

As the first audio stream quality deteriorates, for example because the car is being driven away from the transmitter, the retuning module 24 selects the strongest radio channel with the same audio content, if any, and retunes to this audio content. This can be done by retuning the first tuner to the new channel. This allows for automatic retuning even without RDS.

In alternative embodiments, the audio output is simply switched so that the output of the second tuner is fed to the audio output stage 8.

The embodiment has four key differences from that used in track recognition systems. Firstly, there is no database of tracks required. Secondly, the method simply uses volume peaks, and makes no attempt to check multiple aspects of the recorded track.

Thirdly, the peak timing and comparison of peak times is done at low resolution, for example 1 ms to 2 ms which automatically allows for distortion. This is especially important since there may be considerable distortion at the moment a new radio channel needs to be found. This low resolution can be explicit in the algorithm, by ensuring matches are found even where there is 1 ms or 2 ms difference in measured peak times, or simply be achieved by making the measurements and calculations at low resolution.

This low resolution processing makes it possible to operate the method even when only low processing power is available, as is typical in radios.

Fourthly, in the embodiment the output of the comparison module 22 is continuously updated.

The continuous updating allows the avoidance of false positive channel matches. For example, the same news items or traffic information may be broadcast on different channels. By continuously updating the correlation output, even if an alternative channel is identified as a false match, the retuning module 24 can monitor the output of the comparison module 22 and can correct the match after the news item or traffic information finishes.

The method described is particularly suitable for audio comparison of radio signals for a car radio application. However, the method may also be used in other applications, especially those with the same demands of low processing power requirements together with a need to cope with audio distortion and/or time shifts between audio signals.

One alternative arrangement is to use the comparison algorithm to compare signals received on a pair (or more) of antennas. In many cases, the antennas will be located at the same place so the value of the delay X may in this application be set to zero. This method can be used in a co-channel detector.

Another example is that the method may be used to compare a received audio signal with stored audio signals in a radio equipped media player. When a match is found, the received audio can be replaced with the stored audio, thereby improving its quality especially in weak signal conditions.

It will be appreciated that variations can be made to the embodiment described. The resolution, predetermined correlation value and maximum delay can all be varied as required.

The number N of elements stored in the first and second peak time stores may be varied. The larger the value of N, the better the correlation measurement at a cost of longer times to fill the stores and greater processing power requirements.

The apparatus can be implemented with a variety of hardware and software. For example, the comparison module 22 and retuning module 24 may be implemented on a single chip, using software, or they may be implemented as separate hardware modules. The radio module 4 may also be implemented as a hybrid device.

The first and second stores may both be implemented as parts of the same memory, or different memories may be used.

Depending on the application, the radio module 4 may include additional or fewer components. For example, the tuners 10, 12 can be omitted from the radio module. Alternatively, the audio output stage can be included. This will depend on individual design choice and the availability of matching components.

A further variation is to vary the sensitivity thresholds for the two different peak time stores, which may favour one or other of the stores.

The invention claimed is:

1. An audio comparison method, comprising:
receiving an audio signal from a first radio channel as a first audio stream and outputting that audio signal;
receiving an audio signal from a second radio channel as a second audio stream;
measuring a volume of the first audio stream;
identifying peaks in the measured volume of the first audio stream and storing times of those peaks as first stream peak times as the peaks are identified;
measuring a volume of the second audio stream;
identifying peaks in the measured volume of the second audio stream and storing times of those peaks as second stream peak times as the peaks are identified;
when at least one of a new first stream peak time and a new second stream peak time is stored, comparing the stored first stream peak times and second stream peak times to identify matches between the first stream peak times and the second stream peak times for a constant delay between the first audio stream and second audio stream, the constant delay being any delay less than a predetermined maximum delay; and
outputting a correlation factor based on a best match between the first stream peak times and the second stream peak times;
identifying the second radio channel as a corresponding channel if the correlation factor is at least equal to a predetermined correlation value; and
outputting the second audio stream in place of the first audio stream if the second radio channel is a corresponding channel and the second radio channel has a stronger signal.

2. An audio comparison method according to claim 1, wherein the peak times of short peaks in volume less than a predetermined minimum peak length are not stored.

3. An audio comparison method according to claim 1, wherein matches in peak times are determined to a low resolution between 1 ms and 2 ms so that peak times that occur within the low resolution of one another in the first and second audio streams are determined as a match.

4. An audio comparison method according to claim 1 further comprising:
storing the first stream peak times in a first stream peak time store being able to store a number N of first stream peak times, where N is at least 5, and replacing an earliest entry in the first stream peak time store when a further first stream peak time is identified after the first stream peak time store is full;
storing the second stream peak times in a second stream peak time store being able to store the same number N of first stream peak times, where N is at least 5, and replacing an earliest entry in the second stream peak time store when a further second stream peak time is identified after the second stream peak time store is full; and
starting the step of comparing the first stream peak times and second stream peak times after both the first stream peak time store and the second stream peak time store are full.

5. The audio comparison method of claim 1, wherein the first audio stream is generated by a first radio tuner that is tuned to the first radio channel and the second audio stream is generated by a second radio tuner that is tuned to the second radio channel.

6. The audio comparison method of claim 1, wherein the corresponding channel is a radio channel that carries the same audio content as the first radio channel.

7. An audio comparison unit, comprising:
a first radio tuner for generating a first audio stream from a first radio channel;
a second radio tuner for generating a second audio stream from a second radio channel;
a first stream peak store for storing volume peaks of the first audio stream;
a second stream peak store for storing volume peaks of the second audio stream; and
a comparison module arranged:
to measure continuously the volume of the first audio stream, to identify peaks in the measured volume and to store the times of those peaks in the first peak time store as first stream peak times as the peaks are identified;
to measure continuously the volume of the second audio stream, to identify peaks in the measured volume and to store the times of those peaks in the second peak time store as second stream peak times as the peaks are identified;
to compare, when at least one of a new first stream peak time and a new second stream peak time is stored, the stored first stream peak times and second stream peak times to identify matches between the first stream peak times and the second stream peak times for a constant delay between the first audio stream and second audio stream, the constant delay being any delay less than a predetermined maximum delay; and
to determine a correlation factor based on a best match between the first stream peak times and the second stream peak times;
audio output circuitry for outputting the first audio stream as an audio output; and
a retuning module arranged to tune the second radio tuner to a plurality of second radio channels and to compare the correlation factor with a predetermined correlation value to identify a second radio channel as a corresponding channel if the correlation factor is greater than the predetermined correlation value.

8. An audio comparison unit according to claim 7, wherein the comparison module is arranged not to store the peak times of short peaks in volume less than a predetermined minimum peak length.

9. An audio comparison unit according to claim 7, wherein the comparison module is arranged to determine the matches in peak times are determined to a low resolution between 1 ms and 10 ms so that peak times that occur within the low resolution of one another in the first and second audio streams are determined as a match.

10. An audio comparison unit according to claim 7, wherein:
the first stream peak time store is able to store a number N of first stream peak times, where N is at least 5, the second stream peak time store is able to store the same number N of first stream peak times;

the comparison module is arranged to replace an earliest entry in each peak time store when a further stream peak time is identified after the respective peak time store is full; and to compare the first stream peak times and the second stream peak times after both the first stream peak time store and the second stream peak time store are full.

11. A radio module according to claim 7, wherein the retuning module is arranged to automatically retune the first radio tuner to a said corresponding channel.

12. A car radio comprising a radio module according to claim 7.

13. The audio comparison unit of claim 7, wherein the corresponding channel is a radio channel that carries the same audio content as the first radio channel.

14. A radio method comprising:
receiving an audio signal from a first radio channel as a first audio stream and outputting that audio signal;
receiving a plurality of audio signals from a plurality of second radio channels as a plurality of second audio streams;
carrying out an audio comparison method for each of the plurality of second radio channels to output a correlation factor between the first and the second audio streams;
identifying each second radio channel as a corresponding channel if the correlation factor is at least equal to a predetermined correlation value; and
retuning the first radio channel to be the corresponding channel having the best signal amongst the corresponding channels if that channel has a stronger signal than the first radio channel to output the audio signal from the switched first radio channel as the new output audio signal;

wherein, the audio comparison method comprises:
measuring a volume of the first audio stream;
identifying peaks in the measured volume of the first audio stream and storing times of those peaks as first stream peak times as the peaks are identified;
measuring a volume of the second audio streams;
identifying peaks in the measured volume of the second audio streams and storing times of those peaks as second stream peak times as the peaks are identified;
when at least one of a new first stream peak time and a new second stream peak time is stored, comparing the stored first stream peak times and second stream peak times to identify matches between the first stream peak times and the second stream peak times for a constant delay between the first audio stream and second audio stream, the constant delay being any delay less than a predetermined maximum delay; and
outputting the correlation factor based on a best match between the first stream peak times and the second stream peak times.

15. The radio method of claim 14, wherein the first audio stream is generated by a first radio that is tuned to the first radio channel and the plurality of audio signals is generated by at least a second radio tuner that is tuned to the plurality of second radio channels.

16. The radio method of claim 14, wherein the corresponding channel is a radio channel that carries the same audio content as the first radio channel.

* * * * *